US009542516B1

(12) United States Patent
Chen

(10) Patent No.: US 9,542,516 B1
(45) Date of Patent: Jan. 10, 2017

(54) SPICE CIRCUIT MODEL FOR TWINAXIAL CABLE

(71) Applicant: International Business Machines Corporation, Armonk, NY (US)

(72) Inventor: Zhaoqing Chen, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/047,667

(22) Filed: Feb. 19, 2016

Related U.S. Application Data

(63) Continuation of application No. 14/864,953, filed on Sep. 25, 2015.

(51) Int. Cl.
*G06F 9/455* (2006.01)
*G06F 17/50* (2006.01)

(52) U.S. Cl.
CPC ....... *G06F 17/5036* (2013.01); *G06F 17/5045* (2013.01); *G06F 2217/36* (2013.01)

(58) Field of Classification Search
USPC ........................................................ 716/113
See application file for complete search history.

(56) References Cited

U.S. PATENT DOCUMENTS

| | | |
|---|---|---|
| 8,046,208 B1 | 10/2011 | Cai et al. |
| 8,271,239 B2 | 9/2012 | Hollis |
| 8,386,216 B1 | 2/2013 | Al-Hawari et al. |
| 8,504,345 B1 | 8/2013 | Tsuk et al. |
| 8,892,414 B1 | 11/2014 | Lalgudi et al. |
| 8,904,330 B2 | 12/2014 | Huang |
| 2003/0065498 A1 | 4/2003 | Bois et al. |
| 2013/0006561 A1 | 1/2013 | Hsieh |
| 2014/0103979 A1 | 4/2014 | Kim et al. |
| 2014/0282335 A1 | 9/2014 | Huang |

(Continued)

FOREIGN PATENT DOCUMENTS

| | | |
|---|---|---|
| CN | 102054072 A | 5/2011 |
| WO | 2006128714 A1 | 12/2006 |

OTHER PUBLICATIONS

Broomall et al., "Extending the Useful Range of Copper Interconnects for High Data Rate Signal Transmission", 1997 Electronic Components and Technology Conference, pp. 196-203.

(Continued)

*Primary Examiner* — Bryce Aisaka
(74) *Attorney, Agent, or Firm* — L. Jeffrey Kelly

(57) ABSTRACT

A method to generate a reduced delay twinaxial SPICE model is provided. The method may include measuring near-end S-parameter components and far-end S-parameter components of a twinaxial cable, reducing an original time delay of the far-end S-parameter components by multiplying each of the far-end S-parameter components by a complex exponential based on an equivalent delay length, a signal frequency, and an effective dielectric constant, simulating a signal transmitted across a twinaxial cable by running a 4-port SPICE model using the near-end S-parameter components and the multiplied far-end S-parameter components, and recording a magnitude and a phase of the transmitted signal with respect to frequency as outputs of the reduced delay twinaxial SPICE model.

1 Claim, 12 Drawing Sheets

(56) References Cited

U.S. PATENT DOCUMENTS

2015/0270872 A1* 9/2015 Zhang ..................... H04B 3/32
375/257

OTHER PUBLICATIONS

Charest et al., "Time Domain Delay Extraction-Based Macromodeling Algorithm for Long-Delay Networks", IEEE Transactions on Advanced Packaging, vol. 33, No. 1, Feb. 2010, pp. 219-235.
Charest et al., "Passivity Verification and Enforcement of Delayed Rational Function Macromodels from Networks Characterized by Tabulated Data", SPI 2009, IEEE, 4 pages.
Chen, "Linear Circuit Model Combination for Coupled Noise Simulation by Using Directional Junction", 2005 IEEE, pp. 83-86.
Chen, "Crosstalk Superposition of Multiple Aggressors in Electronic Package System Pre-PD Signal Integrity Simulations", 2006 IEEE Electrical Performance of Electronic Packaging, pp. 115-118.
Chen, "Packaging System S-Parameter Model Decomposition and On-Demand Composition Using Directional Junctions for Signal Integrity Transient Simulation", 2009 Electronic Components and Technology Conference, pp. 1964-1969.
Chen et al., "Differential Twinax Cable Modeling by Measured 4-Port S-Parameters", 2005 IEEE, pp. 87-90.
Chinea et al., "Delay-Based Macromodeling of Long Interconnects From Frequency-Domain Terminal Responses", IEEE Transactions on Advanced Packaging, vol. 33, No. 1, February 2010, pp. 246-256.
Choi et al.,"Constructing 3D Package Component Broadband Electrical Models with Correct DC Values", 2010 IEEE, pp. 253-256.
De Araujo et al., "Full-Wave, TwinAx, Differential Cable Modeling", 2008 Electronic Components and Technology Conference, pp. 1684-1689.
De Araujo et al., "TwinAx Differential Cable Helical Shield Wrap Modeling", 2007 IEEE, pp. 299-302.
Eo et al., "High-Speed VLSI Interconnect Modeling Based on S-Parameter Measurements", IEEE Transactions on Components, Hybrids, and Manufacturing Technology, vol. 16, No. 5, Aug. 1993, pp. 555-562.
Grivet-Talocia, "Delay-Based Macromodels for Long Interconnects via Time-Frequency Decompositions", 2006 IEEE Electrical Performance of Electronic Packaging, pp. 199-202.
Mandrekar et al., "Causality Enforcement in Transient Simulation of Passive Networks through Delay Extraction", IEEE, SPI 2005, pp. 25-28.
Nakhla et al., "DEPACT: Delay Extraction-Based Passive Compact Transmission-Line Macromodeling Algorithm", IEEE Transactions on Advanced Packaging, vol. 28, No. 1, Feb. 2005, pp. 13-23.
Triverio et al., "Identification of Highly Efficient Delay-Rational Macromodels of Long Interconnects From Tabulated Frequency Data", IEEE Transactions on Microwave Theory and Techniques, vol. 58, No. 3, Mar. 2010, pp. 566-577.
Idemworks, "Best-in-class tool for generation of broadband macromodels", http://www.idemworks.com/, 1 page, Copyright® 2007-2015.
Brim, "S-parameter Modeling and Simulation for Signal Integrity Analysis", S-parameter Modeling, UBM Electronics, DesignCon 2012, Where Chipheads Connect, 30 pages.
Kundert, "Simulation of Analog and Mixed-Signal Circuits", Cadence Design Systems, Inc., BCTM Tutorial on Circuit Simulation, 1998, pp. 1-69.
Avanti, "Using Transmission Lines", Chapter 21, Star-Hspice Manual, Release 1998.2, pp. 21-1-21-126.
IBM: List of IBM Patents or Patent Applications Treated as Related (Appendix P), Jul. 12, 2016, 2 pages.
Pending U.S. Appl. No. 14/864,953, filed Sep. 25, 2015, entitled: "Spice Circuit Model for Twinaxial Cable", 39 pages.

\* cited by examiner

Section A-A

Section B-B

SPICE CIRCUIT MODEL FOR TWINAXIAL CABLE

BACKGROUND

The present invention generally relates to circuit modeling and more particularly to SPICE circuit modeling of twinaxial cables.

Simulation Program with Integrated Circuit Emphasis, (hereinafter "SPICE") is an open source analog electronic circuit simulator. A SPICE circuit model may be used to verify the signal integrity of circuit designs and to predict circuit behavior. Twinaxial cables have two signal wires to construct a differential signal pair. In such cases, a first electronic signal traveling through a first signal wire (positive- or P-leg of a differential pair) can influence a second electronic signal on a second signal wire (negative- or N-leg of a differential pair) and vice versa. Specifically, a SPICE circuit model can be used to model the effect of the first electronic signal on the second electronic signal, and vice versa, which can be used to predict electronic signal behavior of the whole differential pair through the twinaxial cable. A SPICE circuit model of twinaxial cables can help to improve circuit designs.

SUMMARY

According to an embodiment of the present invention, a method to generate a reduced delay twinaxial SPICE model is provided. The method may include measuring near-end S-parameter components and far-end S-parameter components of a twinaxial cable, reducing an original time delay of the far-end S-parameter components by multiplying each of the far-end S-parameter components by a complex exponential based on an equivalent delay length, a signal frequency, and an effective dielectric constant, simulating a signal transmitted across a twinaxial cable by running a 4-port SPICE model using the near-end S-parameter components and the multiplied far-end S-parameter components, and recording a magnitude and a phase of the transmitted signal with respect to frequency as outputs of the reduced delay twinaxial SPICE model.

According to another embodiment of the present invention, a computer program product for generating a reduced delay twinaxial SPICE model is provided. The computer includes one or more computer-readable storage media and program instructions stored on the one or more computer-readable storage media, the program instructions includes program instructions to measure near-end S-parameter components and far-end S-parameter components of a twinaxial cable, program instructions to reduce an original time delay of the far-end S-parameter components by multiplying each of the far-end S-parameter components by a complex exponential based on an equivalent delay length, a signal frequency, and an effective dielectric constant, program instructions to simulate a signal transmitted across a twinaxial cable by running a 4-port SPICE model using the near-end S-parameter components and the multiplied far-end S-parameter components, and program instructions to record a magnitude and a phase of the transmitted signal with respect to frequency as outputs of the reduced delay twinaxial SPICE model.

According to another embodiment of the present invention a computer system product for generating a reduced delay twinaxial SPICE model is provided. The computer program product includes one or more computer processors, one or more computer-readable storage media and program instructions stored on the one or more computer-readable storage media for execution by at least one of the one or more computer processors, the program instructions includes program instructions to measure near-end S-parameter components and far-end S-parameter components of a twinaxial cable, program instructions to reduce an original time delay of the far-end S-parameter components by multiplying each of the far-end S-parameter components by a complex exponential based on an equivalent delay length, a signal frequency, and an effective dielectric constant, program instructions to simulate a signal transmitted across a twinaxial cable by running a 4-port SPICE model using the near-end S-parameter components and the multiplied far-end S-parameter components, and program instructions to record a magnitude and a phase of the transmitted signal with respect to frequency as outputs of the reduced delay twinaxial SPICE model.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
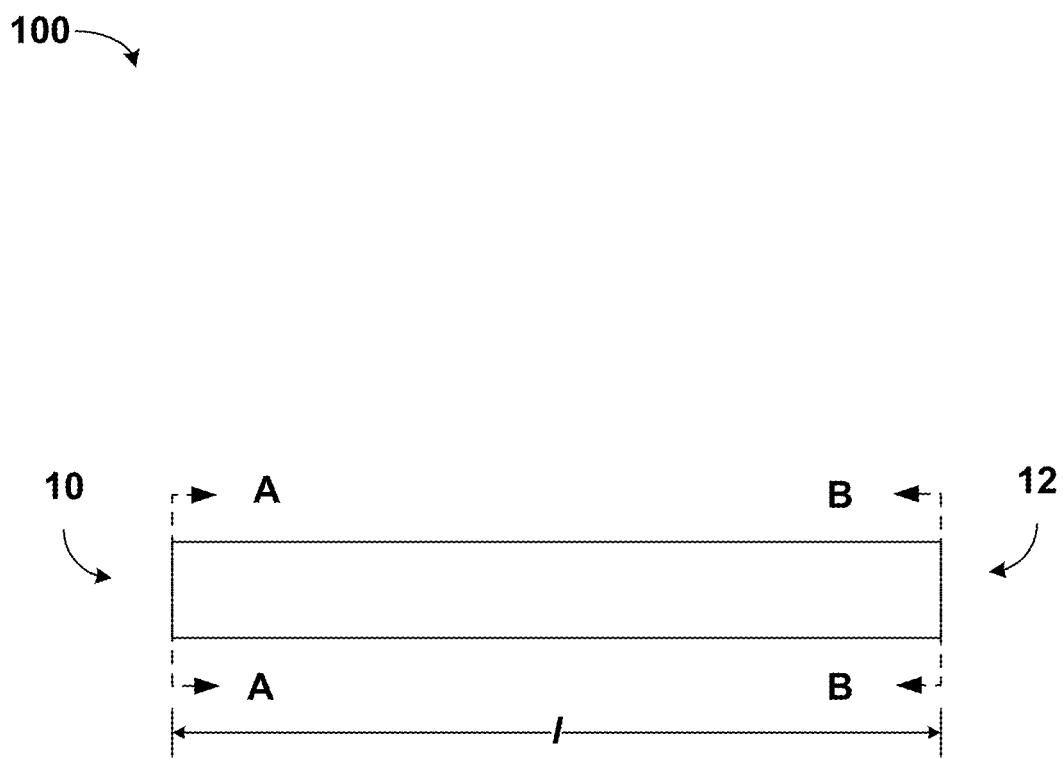
FIG. 1 is a side view of a twinaxial cable according to an exemplary embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper", "lower", "right", "left", "vertical", "horizontal", "top", "bottom", and derivatives thereof shall relate to the disclosed structures and methods, as oriented in the drawing figures. The terms "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

In high-speed differential signaling applications, such as in many high-end and mid-range server systems, a twinaxial cable is used in the middle of a differential channel for a connect distance range of about 1 to 10 m. For system channel signal integrity simulations, a twinaxial cable broadband S-parameter touchstone model is widely used in most fast channel simulation tools to accurately model a twinaxial cable. Although the S-parameter model can be derived by electromagnetic simulations with some assumptions and simplifications, in most applications a directly measured S-parameter model using a vector network analyzer is widely used with advanced probing and de-embedding technology. Using measured S-parameters can avoid the difficult input data collection before an accurate twinaxial cable electromagnetic simulation.

With an accurate twinaxial cable S-parameter model from measurement, several issues remain in using the S-parameter model in system signal integrity simulations, including both fast channel signal integrity simulation based on bit pattern convolution using the channel single-bit response and the general-purpose signal integrity transient simulation. In fast channel signal integrity simulations based on linear system assumption plus some input/output (I/O) algorithmic function support such as algorithmic modeling interface (AMI) models, a small frequency step in the S-parameters is required for a long twinaxial cable to recover the correct time delay, especially considering and accounting for crosstalk from other channels. The frequency step required by the long twinaxial cable is usually much smaller than those required by other channel components with much smaller time delays. The relatively small frequency step of the long twinaxial cable may be inconsistent with the S-parameter files of other components, and may result in a larger S-parameter files producing longer measurement times.

In the frequency domain, an electronic signal can be described by magnitude and phase, and may vary over a wide range of frequencies.

In regular transient simulation which simulates nonlinear properties more accurately, some commercial tools support S-parameter model by embedded algorithms of macromodeling in which the large delay usually results in large orders of the curve-fitting function and/or low accuracy. For large delay components like a long twinaxial cable, a large number of frequency points in the S-parameters are required. The same problem exists when using some commercial tools to convert the S-parameter model into a SPICE circuit model which can be usually accepted by every general-purpose transient simulation tool. In addition, there is a delay defined causality problem in the large delay S-parameter macromodeling. This problem is very difficult to resolve accurately and efficiently.

A twinaxial cable SPICE circuit modeling method is described in Zhaoqing Chen, Mangal Prasad, Daniel O'Connor, Paul Bond, Andrew Muszynski, "Differential Twinax Cable Modeling by Measured 4-Port S-Parameter," Electrical Performance of Electronic Packaging, IEEE 14$^{th}$ Topical Meeting on Electrical Performance of Electronic Packaging, Austin, Tex., October 2005, pp. 87-90, (hereinafter referred to as "reference 1") which is herein incorporated by reference in its entirety. The SPICE circuit model described in reference 1 only partially resolves the above mentioned problems. In the modeling procedure of reference 1, there is a symmetric assumption which eliminates all asymmetrical properties from the SPICE circuit model such as the P-N skew which exists in the original measured S-parameters. A more general accurate modeling method is needed to accurately keep the transmission and return loss and other important properties such as the common-to-differential-mode and differential-to-common-mode conversion, and the P-N skew. The P-N skew is the difference between the time delays by the P-leg and N-leg of a differential pair. Under the symmetric assumption, the time delays by the P-lag and N-leg are the same, so there will be no P-N skew. In the symmetric assumption, there is no P-N skew, as well as the mode conversions.

S-parameters describe the electrical behavior of linear electrical networks when undergoing various steady state stimuli by electrical signals. Although applicable at any frequency, S-parameters are mostly used for networks operating at radio frequency (RF) and microwave frequencies where signal power and energy considerations are more easily quantified than currents and voltages. S-parameters change with frequency, so frequency must be specified for any S-parameter measurements stated, in addition to the characteristic impedance or system impedance. S-parameters are readily represented in matrix form and obey the rules of matrix algebra.

The present invention generally relates to circuit modeling and more particularly to SPICE circuit modeling of twinaxial cables. One way to model twinaxial cables using a SPICE circuit model may include using a measured 4-port S-parameter model and modifying the 4-port S-parameter model to a reduced delay twinaxial SPICE model. The 4-port S-parameter model includes near-end S-parameter components and far-end 4-port S-parameter components. The reduced delay twinaxial SPICE model introduces a delay to the far-end S-parameter components. One embodiment by which to model twinaxial cables using a reduced delay twinaxial SPICE circuit model is described in detail below by referring to the accompanying drawings in FIGS. 1 to 17.

Referring to FIG. 1, a twinaxial cable 100 is shown according to an exemplary embodiment. In general, a twinaxial cable may include two inner signal wires, each individually surrounded by an insulating layer and the combined signal wires and insulators are surrounded by a conducting shield or a ground foil. The twinaxial cable 100 has a first end 10 and a second end 12. The twinaxial cable 100 has a length l, which typically may range from about 0.5 m to about 15 m.

Figure 2:
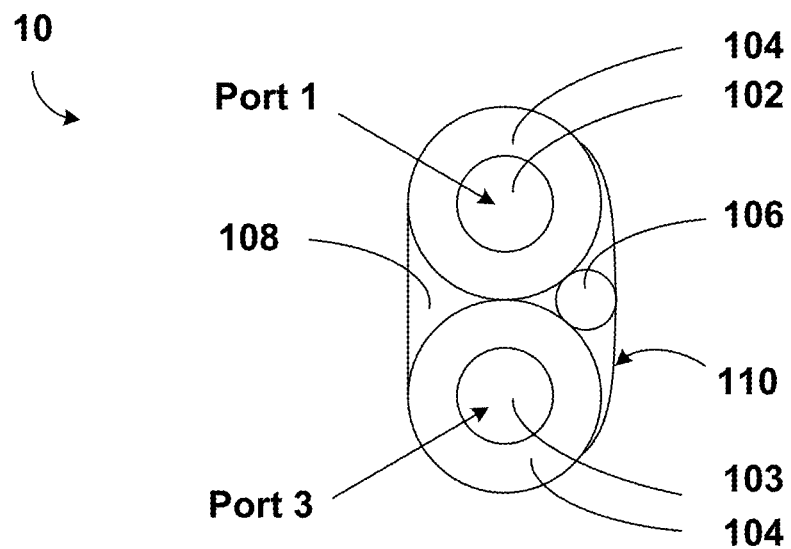
FIG. 2 is a cross-sectional view of FIG. 1, along section line A-A, according to an exemplary embodiment.
Figure 3:
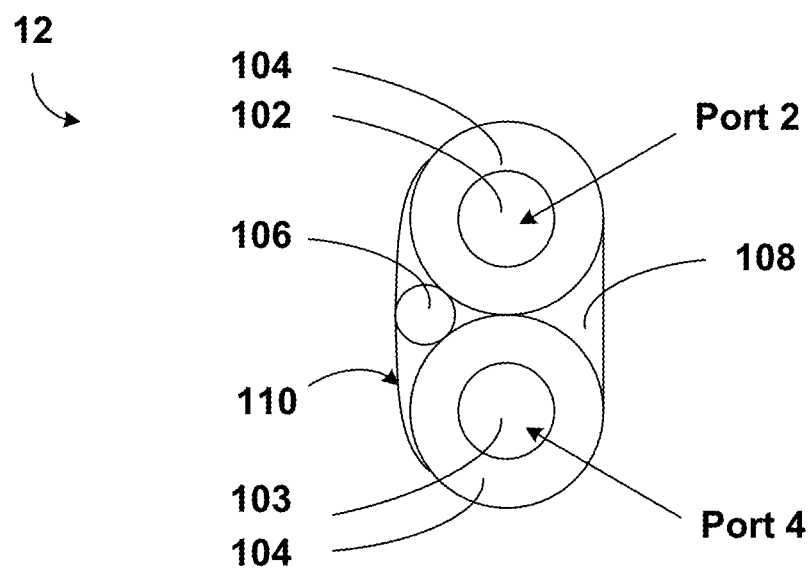
FIG. 3 is a cross-sectional view of FIG. 1, along section line B-B, according to an exemplary embodiment.

Referring to FIGS. 2 and 3, a cross-sectional view of the twinaxial cable 100 is shown according to an exemplary embodiment. FIG. 2 shows a cross-sectional view of the first end 10 along section line A-A. FIG. 3 shows a cross-sectional view of the second end 12 along section line B-B. The twinaxial cable 100 has an upper signal wire 102, a lower signal wire 103, two insulators 104, a drain 106, an air gap 108 and ground foil 110. The upper signal wire 102, the lower signal wire 103, and the ground or drain 106 may be made of a conductive material, such as copper, stainless steel, aluminum, an alloy, copper plated steel or other conductive metal or alloy. The insulator 104 may be polyethylene, polypropylene, polyurethane and other insulating materials. The air gap 108 may be the space between the insulator 104 surrounding the upper signal wire 102, the insulator 104 surrounding the lower signal wire 103 and the drain 106. The ground foil 110 may be made from a thin layer of aluminum directly attached to a thin layer of polyester, from a braid of woven mesh of bare or tinned copper wire, or may have multiple layers including thin layers of aluminum and/or braids.

For modeling purposes, the twinaxial cable 100 may have the following port definitions: the first end 10 has a first port (hereinafter "Port 1") and a third port (hereinafter "Port 3") and the second end 12 has a second port (hereinafter "Port 2") and a fourth port (hereinafter "Port 4"). Port 1 represents one end of the upper signal wire 102, and Port 3 represents one end of the lower signal wire 103. Port 2 represents another end of the upper signal wire 102, and Port 4 represents another end of the lower signal wire 103. Stated differently, Ports 1 and 2 represent opposite ends of the upper signal wire 102, and Ports 3 and 4 represent opposite ends of the lower signal wire 103.

A reduced delay twinaxial SPICE model is proposed and described in detail below with reference to FIG. 5. In the reduced delay twinaxial SPICE model, the time delay of the far-end S-parameter components are reduced. The reduction of the time delay in far-end S-parameter components results in a decrease of the time delay on far-end responses in the reduced delay twinaxial SPICE model which makes the SPICE circuit modeling easier. Far-end responses are a resulting electronic signal of an electronic signal after it has been transmitted across a twinaxial cable. This reduction provides for easier treatment in a fast channel simulation without using a very small frequency step in the S-parameter model. This reduction also provides S-parameter macro-modeling in regular transient simulation without large orders of the curve-fitting. The reduced delay twinaxial SPICE model can be used directly in the fast channel simulation and in general purpose transient simulation, respectively, with a known and controllable delay reduction compared with the original S-parameter components.

Figure 4:
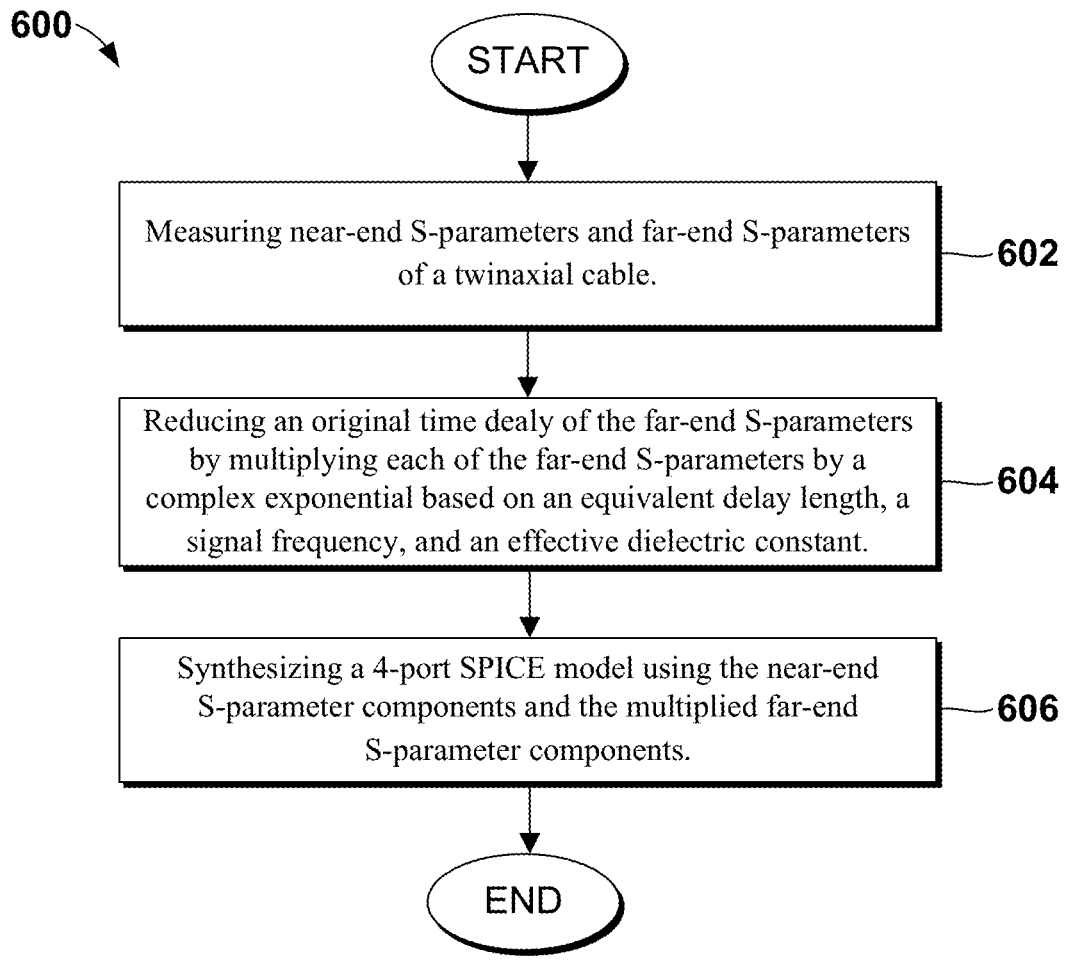
FIG. 4 is an operational flowchart, according to various embodiments of the disclosure.

Referring to FIG. 4, an algorithm 600 for creating a reduced delay twinaxial SPICE model, according to various embodiments of the disclosure, is illustrated. Measuring the 4-port S-parameters including the near-end S-parameter components and the far-end S-parameter components of a twinaxial cable is performed at step 602. Reducing an original time delay of the far-end S-parameters by multiplying each of the far-end S-parameter components by a complex exponential based on an equivalent delay length, a signal frequency, and an effective dielectric constant is performed at step 604. Synthesizing a 4-port SPICE model using the near-end S-parameter components and the multiplied far-end S-parameter components is performed at step 606.

Figure 5:
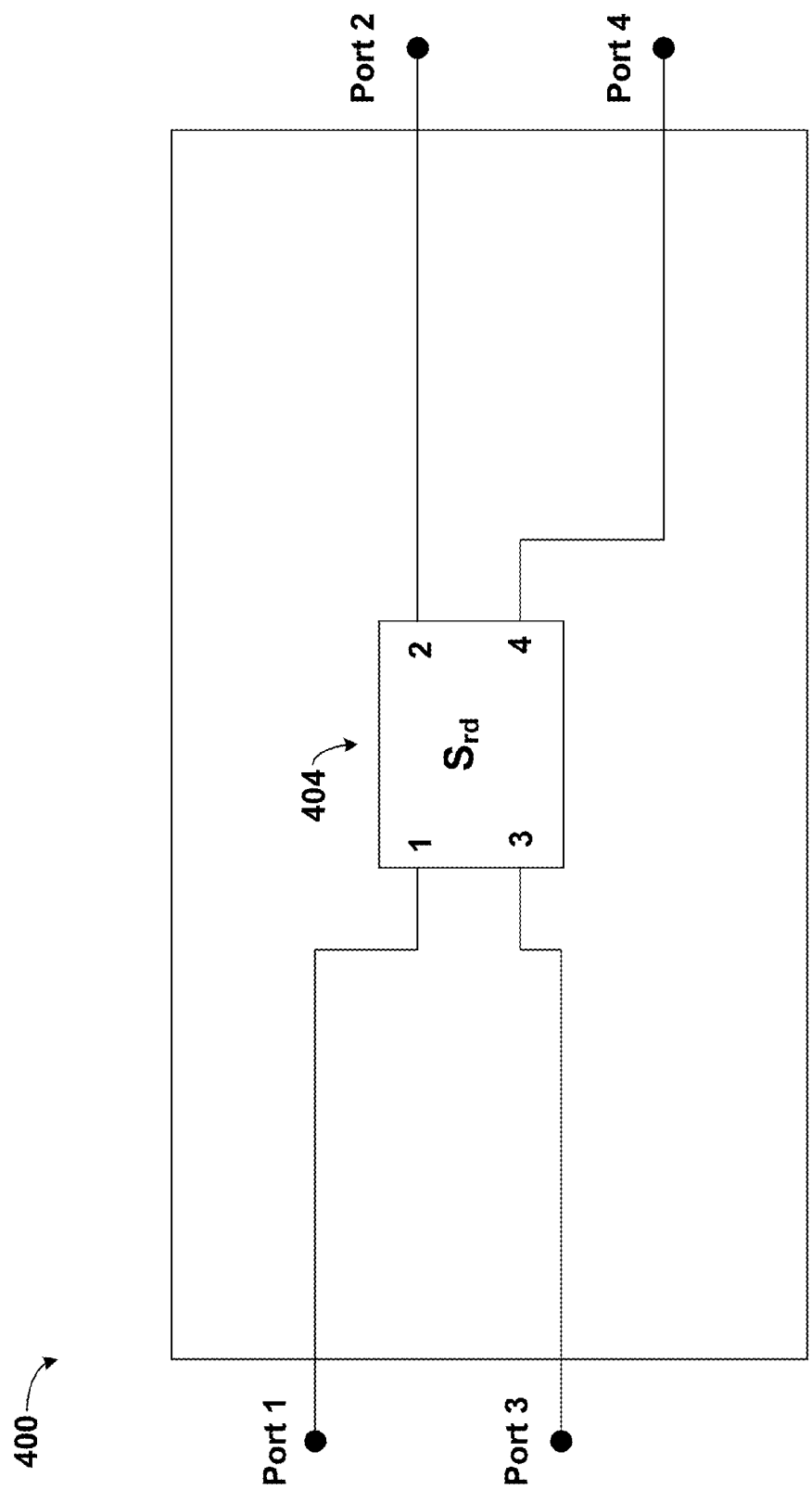
FIG. 5 is a reduced delay twinaxial SPICE Model.

Referring to FIG. 5, a reduced delay twinaxial SPICE model 400 (hereinafter "reduced delay model") is shown. The reduced delay model 400 includes a reduced delay circuit model 404 (hereinafter "$S_{rd}$ model"). The $S_{rd}$ model 404 has four nodes, which are identified in the figure as 1, 2, 3 and 4. In the reduced delay model 400, Port 1 of the twinaxial cable 100 is coupled to node 1 of the $S_{rd}$ model 404, Port 2 of the twinaxial cable 100 is coupled to node 2 of the $S_{rd}$ model 404, Port 3 of the twinaxial cable 100 is coupled to node 3 of the $S_{rd}$ model 404, and Port 4 of the twinaxial cable 100 is coupled to node 4 of the $S_{rd}$ model 404.

Following is a description of the $S_{rd}$ model 404. The twinaxial cable 100 can be modeled as a four port network. A four port network has sixteen S-parameters, eight of the S-parameter components are near-end responses and the other eight of the S-parameter are far-end responses. Each of the S-parameters is shown in the format of $S_{XY}$ where the subscript numbers indicate the port or node numbers. Table 1 below shows the definitions of each of the sixteen S-parameters.

TABLE 1

Four Port Network S-parameter components

| Near-end S-parameter Components | Far-end S-parameter Components |
|---|---|
| (1) $S_{11}$ = node 1 voltage reflection coefficient | (9) $S_{12}$ = reverse voltage gain |
| (2) $S_{13}$ = near-end coupling from node 3 to node 1 | (10) $S_{14}$ = far-end coupling from node 4 to node 1 |
| (3) $S_{22}$ = node 2 voltage reflection coefficient | (11) $S_{21}$ = forward voltage gain |
| (4) $S_{24}$ = near-end coupling from node 4 to node 2 | (12) $S_{23}$ = far-end coupling from node 3 to node 2 |
| (5) $S_{31}$ = near-end coupling from node 1 to node 3 | (13) $S_{32}$ = far-end coupling from node 2 to node 3 |
| (6) $S_{33}$ = node 3 voltage reflection coefficient | (14) $S_{34}$ = reverse voltage gain |
| (7) $S_{42}$ = near-end coupling from node 2 to node 4 | (15) $S_{41}$ = far-end coupling from node 1 to node 4 |

TABLE 1-continued

Four Port Network S-parameter components

| Near-end S-parameter Components | Far-end S-parameter Components |
|---|---|
| (8) $S_{44}$ = node 4 voltage reflection coefficient | (16) $S_{43}$ = forward voltage gain |

The original S-parameters includes a large time delay on far-end response S-parameter components. The far-end S-parameter components are $S_{12}$, $S_{21}$, $S_{14}$, $S_{41}$, $S_{23}$, $S_{32}$, $S_{34}$, $S_{43}$, due to the physical length l of the twinaxial cable. The near-end S-parameters are $S_{11}$, $S_{13}$, $S_{22}$, $S_{24}$, $S_{31}$, $S_{33}$, $S_{42}$, $S_{44}$, which are measured within either the first end 10 or within the second end 12. S-parameters for the reduced-delay $S_{rd}$ model 404 are shown in Table 2. The near-end S-parameter components in Table 2 are the same as in Table 1 for the near-end S-parameter components for the $S_{rd}$ model 404. A negative delay is applied in the form of a multiplication factor to the far-end S-parameter components (9)-(16) of Table 1 resulting in the far-end S-parameter components (9)-(16) of Table 2 for the $S_{rd}$ model 404. Each of the far-end S-parameter components (9)-(16) of Table 1 are multiplied by the negative delay to achieve the $S_{rd}$ model 404 S-parameters. The negative delay, or multiplication factor, may be represented by the equation $e^{j\beta L}$. Since the negative delay $e^{j\beta L}$ has a unit magnitude ($I\ e^{j\beta L}I=1$), the transformation of the far-end S-parameter components (9)-(16) of Table 1 will keep the magnitude of each far-end S-parameter component in the original measured S-parameter model as shown in Table 1. The effect of applying the negative delay to the far-end S-parameter components in equations (9)-(16) is a reduction of the large original time delay (corresponding to a reduction of the phase angle) while keeping the original S-parameter impedance $Z_0$ of the S-parameters in the $S_{rd}$ model 404. For common practice, $Z_0=50\Omega$.

TABLE 2

Reduced Delay S-parameter components

| | Near-end S-parameter Components | | Far-end S-parameter Components |
|---|---|---|---|
| (1) | $S_{rd11} = S_{11}$ | (9) | $S_{rd12} = S_{12}\ e^{j\beta L}$ |
| (2) | $S_{rd13} = S_{13}$ | (10) | $S_{rd14} = S_{14}\ e^{j\beta L}$ |
| (3) | $S_{rd22} = S_{22}$ | (11) | $S_{rd21} = S_{21}\ e^{j\beta L}$ |
| (4) | $S_{rd24} = S_{24}$ | (12) | $S_{rd23} = S_{23}\ e^{j\beta L}$ |
| (5) | $S_{rd31} = S_{31}$ | (13) | $S_{rd32} = S_{32}\ e^{j\beta L}$ |
| (6) | $S_{rd33} = S_{33}$ | (14) | $S_{rd34} = S_{34}\ e^{j\beta L}$ |
| (7) | $S_{rd42} = S_{42}$ | (15) | $S_{rd41} = S_{41}\ e^{j\beta L}$ |
| (8) | $S_{rd44} = S_{44}$ | (16) | $S_{rd43} = S_{43}\ e^{j\beta L}$ |

The reduction of the time delay for the far-end S-parameter components may be represented as a complex exponential, $e^{j\beta L}$, based on an equivalent delay length, a signal frequency, and an effective dielectric constant.

The natural logarithm of a number is its logarithm to the base e, where e is a constant approximately equal to 2.718. The variable j is the unit imaginary part of a complex number, where $j^2=-1$. The equation of a complex number is a +jb, where a and b are real numbers.

Following is the equation for β.

$$\beta = 2\pi f \sqrt{\varepsilon_{reff}} \frac{L}{c_0} \quad \text{[Equation 1]}$$

In equation 1, f is the signal frequency, $c_0$ is the speed of light in a vacuum, $\varepsilon_{reff}$ is an effective dielectric constant of the insulator 104, taking into account the effect of the small air gaps 108 in the twinaxial cable structure, and L is an equivalent delay length. For simplicity, we can use the real dielectric constant $\varepsilon_r$ to replace the effective dielectric constant $\varepsilon_{reff}$ because the numbers are very close. L is the equivalent delay length, which should be adjusted to a value a little bit shorter than the real physical twinaxial cable length l to keep several positive phase rotation cycles (with a small positive time delay) for each far-end S-parameters of the $S_{rd}$ model 404 in the whole frequency band. Since the phase value is determined by βL, it is equivalent to adjust $\varepsilon_{reff}$ instead of L.

A complete delay twinaxial SPICE model is proposed and described in detail below with reference to FIG. 6. When the actual large delay of the twinaxial cable is important or preferred, the complete-delay twinaxial SPICE model is proposed which recovers the original delay. The complete delay twinaxial SPICE model includes the reduced delay twinaxial SPICE model described above, in addition to one or more ideal transmission line circuit models and directional junction circuit models. The addition of the ideal transmission circuit line model is to recover the complete time delay of the original S-parameters which had been reduced in the reduced delay twinaxial SPICE model. The addition of the directional junction circuit models may be used to block incident waves at any ports connecting the ideal transmission circuit line model.

Figure 6:
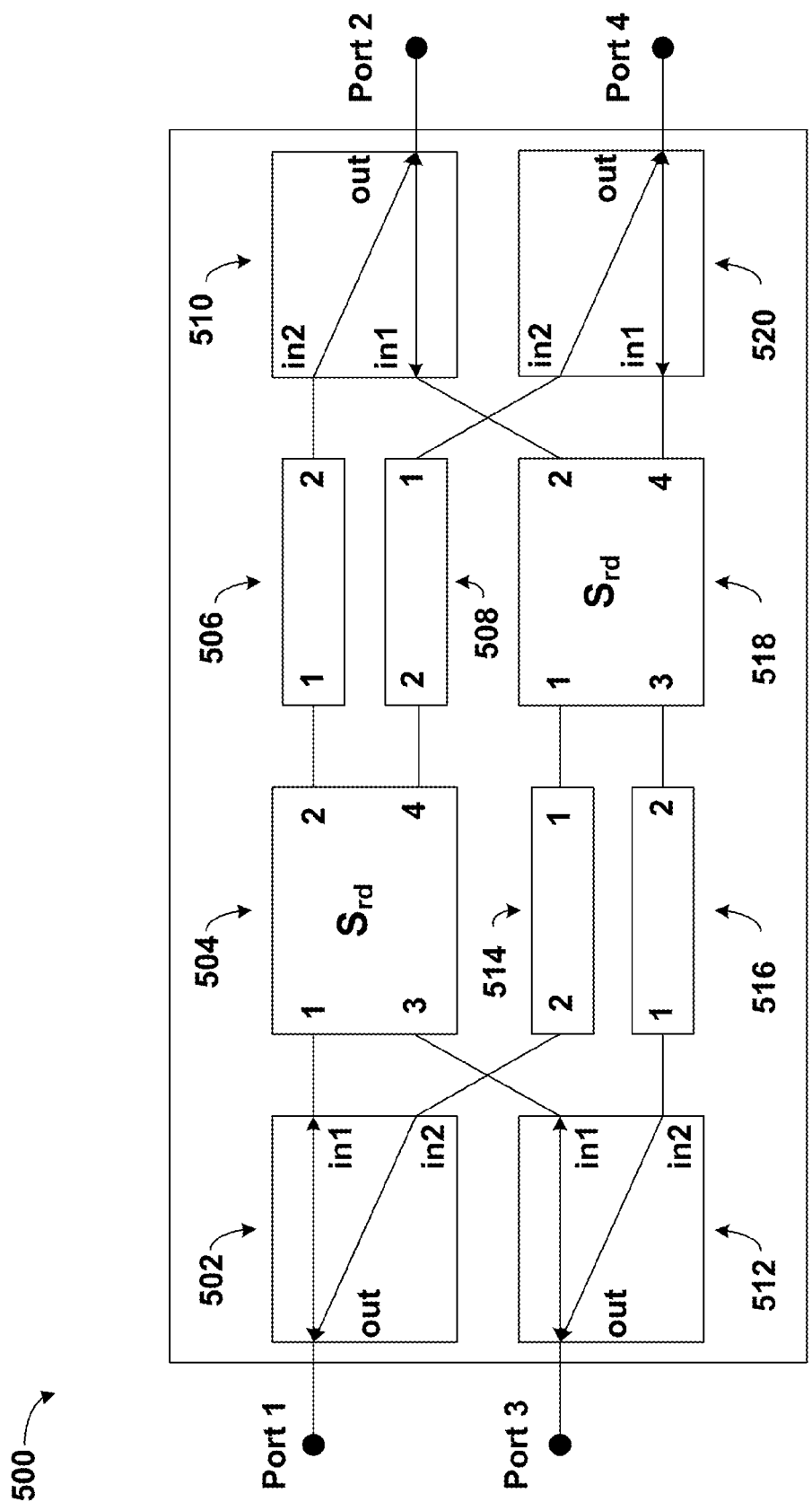
FIG. 6 is a complete delay twinaxial SPICE Model.

Referring to FIG. 6, a complete delay twinaxial SPICE model 500 is shown (hereinafter "complete delay model"). The complete delay model 500 may include two $S_{rd}$ models 504, 518, four ideal transmission line models 506, 508, 514, 516 (hereinafter "line model"), and four directional junction circuit models 502, 510, 512, 520 (hereinafter "DJ model"). Like above, each of the $S_{rd}$ models 504, 518 has four nodes, which are identified in the figure as 1, 2, 3 and 4. Each of the line models 506, 508 514, 516 have two nodes, which are identified in the figure as 1 and 2. Each of the DJ models 502, 510, 512, 520 have 3 nodes, which are identified in the figure as in1, in2 and out. It should be noted that the $S_{rd}$ models 504, 518 may be substantially similar and are essentially the same model as the $S_{rd}$ model 404 described above with reference to FIG. 5.

In the complete delay model 500, Port 1 of the twinaxial cable 100 is coupled to the out node of the DJ model 502. The in1 node of the DJ model 502 is coupled to node 1 of the $S_{rd}$ model 504. The in2 node of the DJ model 502 is coupled to node 2 of the line model 514. Node 1 of the $S_{rd}$ model 504 is coupled to the in1 node of the DJ model 502. Node 2 of the $S_{rd}$ model 504 is coupled to the node 1 of the line model 506. Node 3 of the $S_{rd}$ model 504 is coupled to the in1 node of the DJ model 512. Node 4 of the $S_{rd}$ model is coupled to node 2 of the line model 508. Node 2 of the line model 506 is coupled to the in2 node of the DJ model 510. Node 1 of the line model 508 is coupled to the in2 node of the DJ model 520. The in2 node of the DJ model 510 is coupled to node 2 of the line model 506. The in1 node of the DJ model 510 is coupled to node 2 of the $S_{rd}$ model 518. The out node of the DJ model 510 is coupled to Port 2 of the twinaxial cable 100.

Port 3 of the twinaxial cable 100 is coupled to the out node of the DJ model 512. The in1 node of the DJ model 512 is coupled to node 3 of the $S_{rd}$ model 504. The in2 node of the DJ model 512 is coupled to node 1 of the line model 516. Node 2 of the line model 516 is coupled to node 3 of the $S_{rd}$ model 518. Node 2 of the line model 514 is coupled to the in2 node of the DJ model 502. Node 1 of the line model 514 is coupled to node 1 of the $S_{rd}$ model 518. Node 2 of the $S_{rd}$ model 518 is coupled to the in1 node of the DJ model 510. Node 3 of the $S_{rd}$ model 518 is coupled to node 2 of the line model 516. Node 4 of the $S_{rd}$ model 518 is coupled to the in1 node of the DJ model 520. The in2 node of the DJ model 520 is coupled to node 1 of the line model 508. The out node of the DJ model 520 is coupled to Port 4 of the twinaxial cable 100.

In an embodiment, the DJ models 502, 510, 512, 520, can be modeled as a 2:1 Directional Junction model for testing purposes from the following reference for a 3:1 Directional Junction Model by terminating an in3 node of the 3:1 Directional Junction Model to ground with a 50 ohm resistor. The 3:1 Directional Junction Model is described in Zhaoqing Chen, "Packaging System S-Parameter Model Decomposition and On-Demand Composition Using Directional Junctions for Signal Integrity Transient Simulation," Proceedings 2009 IEEE 59$^{th}$ Electronic Components and Technology Conference, San Diego, Calif., May 2009, pages 1964-1969, (hereinafter referred to as "reference 2") which is herein incorporated by reference in its entirety.

The line models 506, 508, 514, 516, can be modeled for testing purposes with characteristic impedance of $Z_{c0}$ and time delay of $t_{c0}$. The line models 506, 508, 514, 516, are used for to recover the complete time delay (or original delay) of the original measured S-parameters. Since $Z_{c0}$ is equal to the S-parameter reference impedance, the operation of the line model 506, 508, 514, 516 on the complete delay twinaxial SPICE model is equivalent to the S-parameter phase shift on the S-parameters related to the nodes directly connecting to the line model 506, 508, 514, 516. The S-parameters with phase shifted by operation of the ideal transmission line include not only the ones representing the far-end response but also the ones representing the near-end response. To recover the original complete delay of the measured S-parameters, the $t_{c0}$ is added to the S-parameters representing the far-end response. To avoid unwanted phase shift to the S-parameters representing the near-end response, the 2:1 Directional Junction Model, described above, can be used to block incident waves at a port connecting the line models 506, 508, 514, 516. The complete delay model 500 has two parallel branches, one for the accurate near-end property modeling at each end of the twinaxial cable, and one for accurate far-end property modeling at each end of the twinaxial cable. The $S_{rd}$ models 504, 518 include properties for the original near-end and reduced-delay far-end responses of the original measured S-parameter model being recovered.

Figure 7:
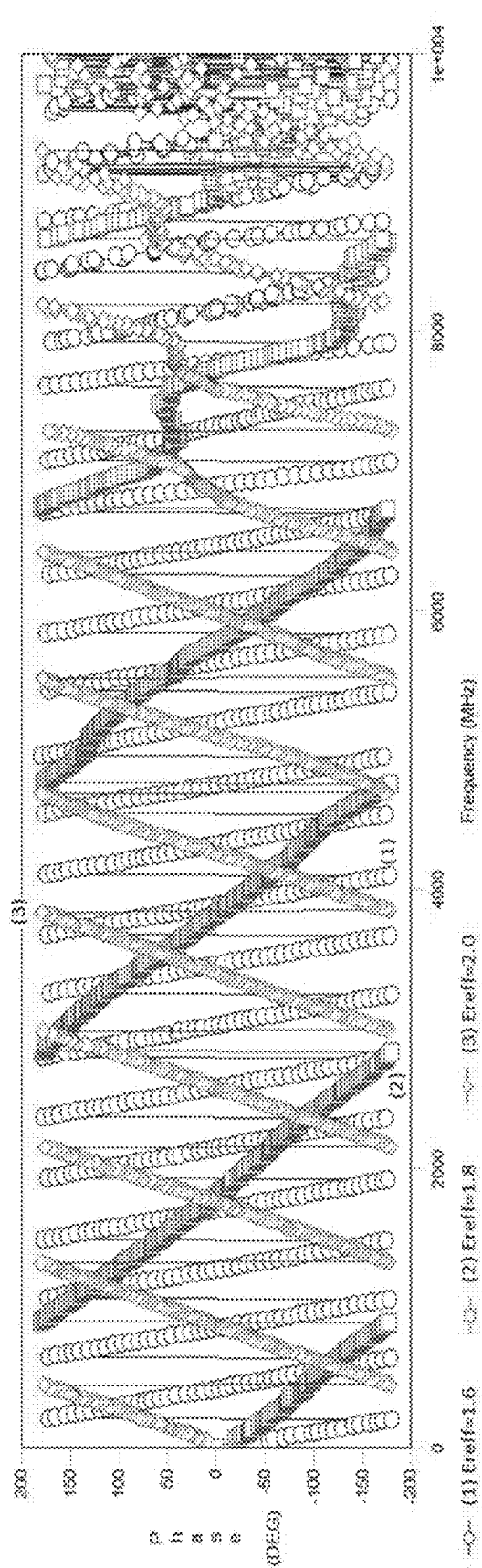
FIG. 7 is a graph of an Adjustment of $\in_{reff}$ to determine $t_{d0}$ according to an exemplary embodiment.

Referring to FIG. 7, shown is a graph of Adjustment of $\in_{reff}$ to determine $t_{d0}$. In this graph three $S_{21}$ phase angle curves are shown corresponding to three different $\in_{reff}$ values. The x-axis shows frequency in MHz, the y-axis shows Phase, in degrees from negative 200 degrees to 200 degrees. The three $S_{21}$ phase angle curves correspond to $\in_{reff}$ values of 1.6 in curve 1 of FIG. 6, 1.8 in curve 2 of FIG. 6, and 2.0 in curve 3 of FIG. 6. The curve 1 of FIG. 6 shows a large reduced delay with many cycles in the phase rotation. Using the $\in_{reff}$ value of 1.6 with many cycles or rotation will generate large data demands on a SPICE model generation. The curve 3 of FIG. 6 shows a negative reduced delay, which is a non-physical delay and is not good for a SPICE model generation. The curve 2 of FIG. 6 is the most suitable value for $\in_{reff}$.

Figure 8:
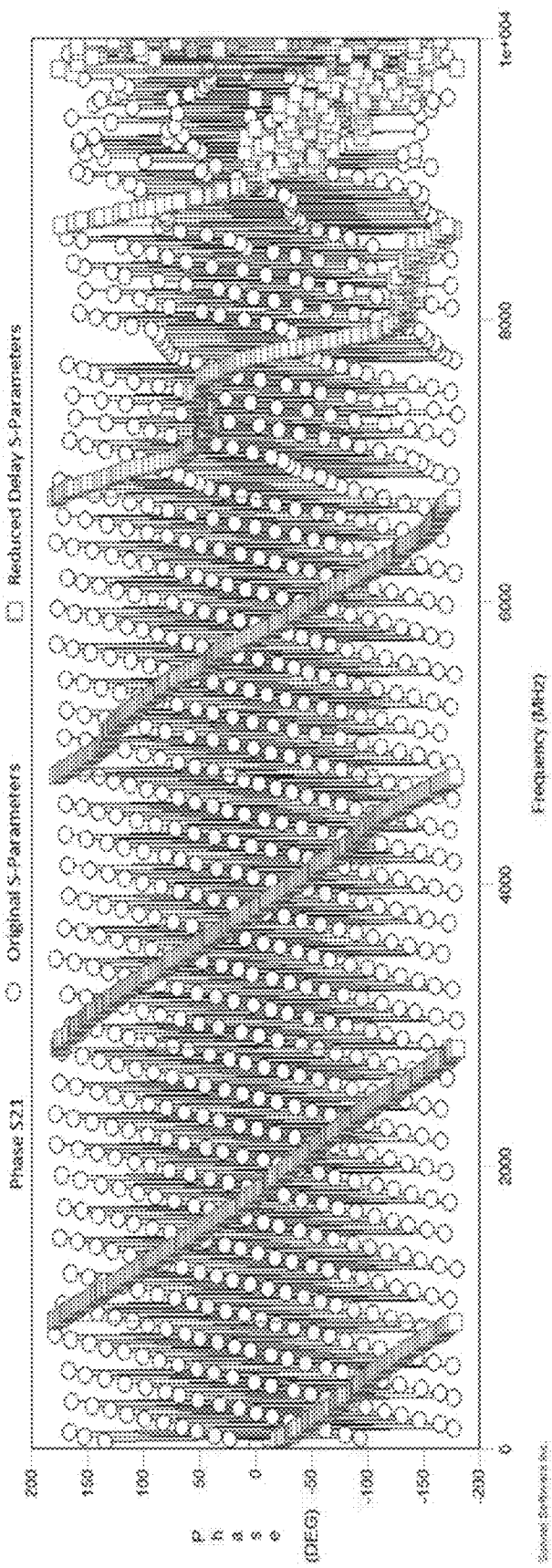
FIG. 8 is a graph of Phase of $S_{21}$ Before and After Reduced Delay according to an exemplary embodiment.

Referring to FIG. 8, shown is a graph of the Phase of $S_{21}$ Before and After Reduced Delay. In the graph the curve 2 of FIG. 6 is compared with the phase rotation of the original measured $S_{rd21}$. The curve 2 of the FIG. 6 is the most suitable $\in_{reff}$ values of 1.8. The x-axis shows frequency in MHz, the y-axis shows Phase, in degrees from −200 degrees to 200 degrees.

Figure 9:
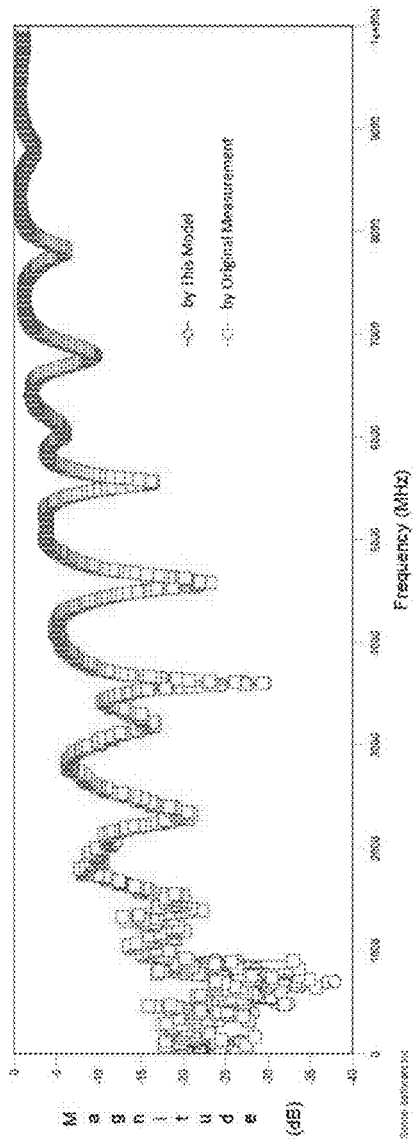
FIG. 9 is a graph of $S_{11}$ (Return Loss) Frequency vs. Magnitude according to an exemplary embodiment.
Figure 10:
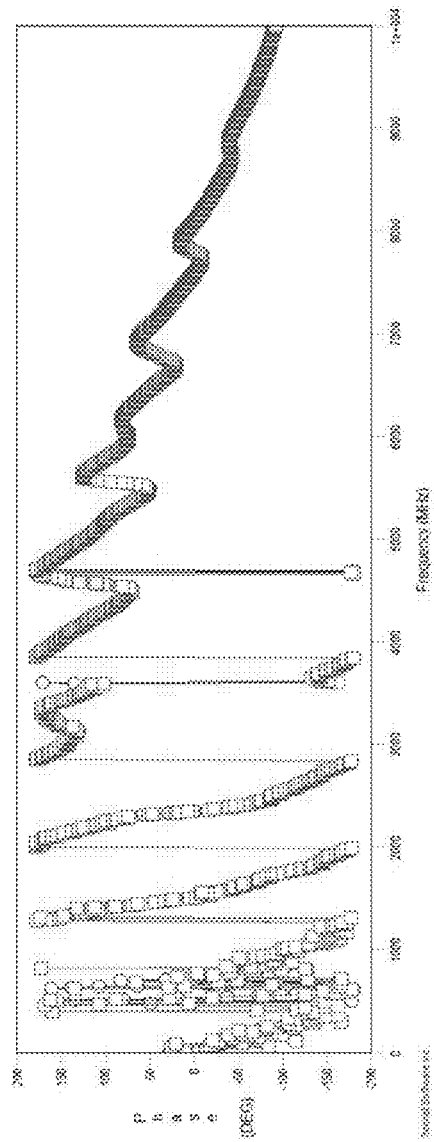
FIG. 10 is a graph of $S_{11}$ (Return Loss) Frequency vs. Phase according to an exemplary embodiment.

Referring to FIGS. 9 and 10, shown in FIG. 9 is a graph of $S_{11}$ (Return Loss) Frequency vs. Magnitude, while shown in FIG. 10 is a graph of $S_{11}$ (Return Loss) Frequency vs. Phase. In FIG. 9, the x-axis is frequency in MHz and the x-axis is magnitude in dB. The squares show the original measurements of $S_{11}$ frequency, while the circles show the $S_{11}$ values per the $S_{rd}$ model 404. There is a strong correlation between the original measurements and the $S_{rd}$ model 404. In FIG. 10, the x-axis is frequency in MHz and the x-axis is phase in degrees. The squares show the original measurements of $S_{11}$ frequency, while the circles show the $S_{11}$ values per the $S_{rd}$ model 404. There is a strong correlation between the original measurements and the $S_{rd}$ model 404. These two graphs also show a benefit of the $S_{rd}$ model 404, such that the requirement for a small frequency steps in S-parameter measurement can be eliminated. The graphs show that accurate results can be obtained without small frequency steps, reducing the need for magnitudes of calculations.

Figure 11:
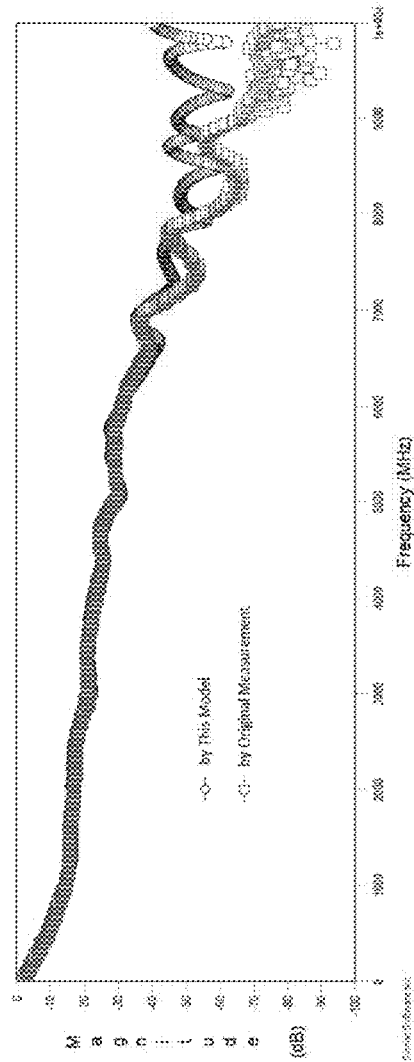
FIG. 11 is a graph of $S_{12}$ (Transmission) Frequency vs. Magnitude according to an exemplary embodiment.
Figure 12:
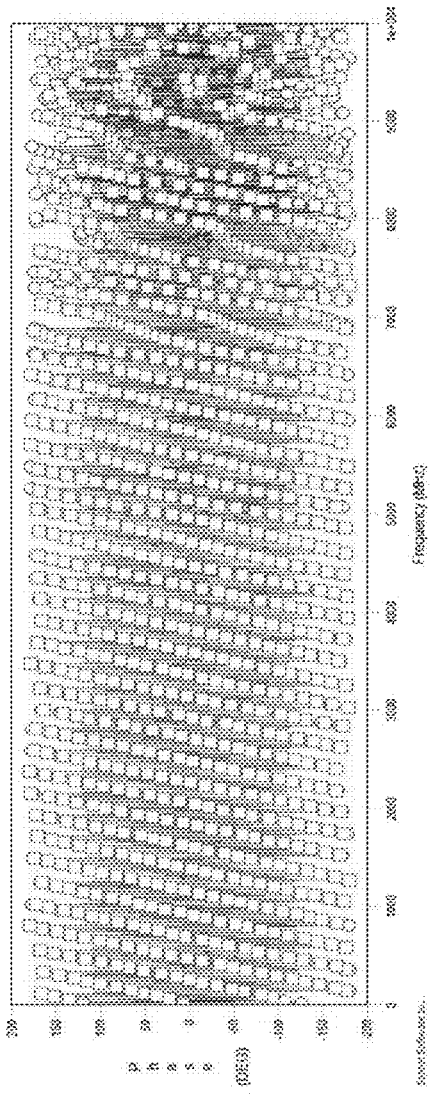
FIG. 12 is a graph of $S_{12}$ (Transmission) Frequency vs. Phase according to an exemplary embodiment.

Referring to FIGS. 11 and 12, shown in the FIG. 11 is a graph of $S_{12}$ (Transmission) Frequency vs. Magnitude, while shown in FIG. 12 is a graph of $S_{12}$ (Transmission) Frequency vs. Phase. In FIG. 11, the x-axis is frequency in MHz and the x-axis is magnitude in dB. The squares show the original measurements of $S_{21}$ frequency, while the circles show the $S_{21}$ values per the $S_{rd}$ model 404. There is a strong correlation between the original measurements and the $S_{rd}$ model 404. In FIG. 12, the x-axis is frequency in MHz and the x-axis is phase in degrees. The squares show the original measurements of $S_{21}$ frequency, while the circles show the $S_{12}$ values per the $S_{rd}$ model 404. There is a strong correlation between the original measurements and the $S_{rd}$ model 404.

Figure 13:
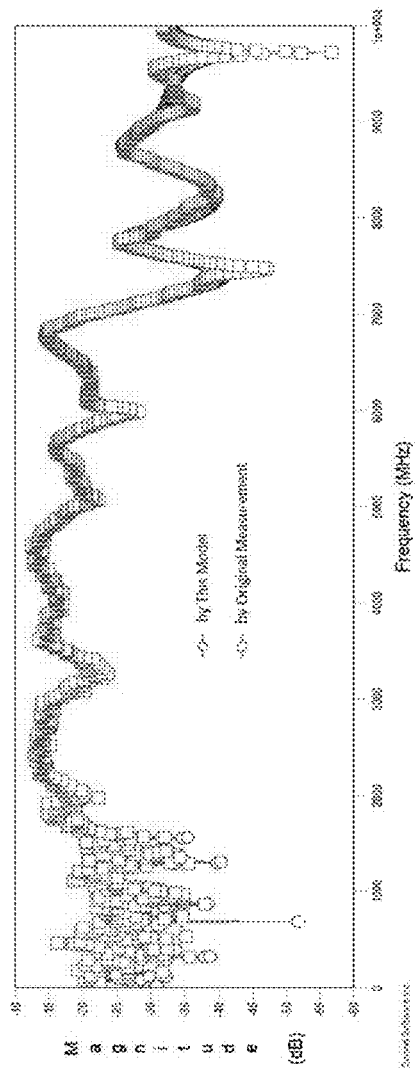
FIG. 13 is a graph of $S_{13}$ (Near-End Coupling) Frequency vs. Magnitude according to an exemplary embodiment.
Figure 14:
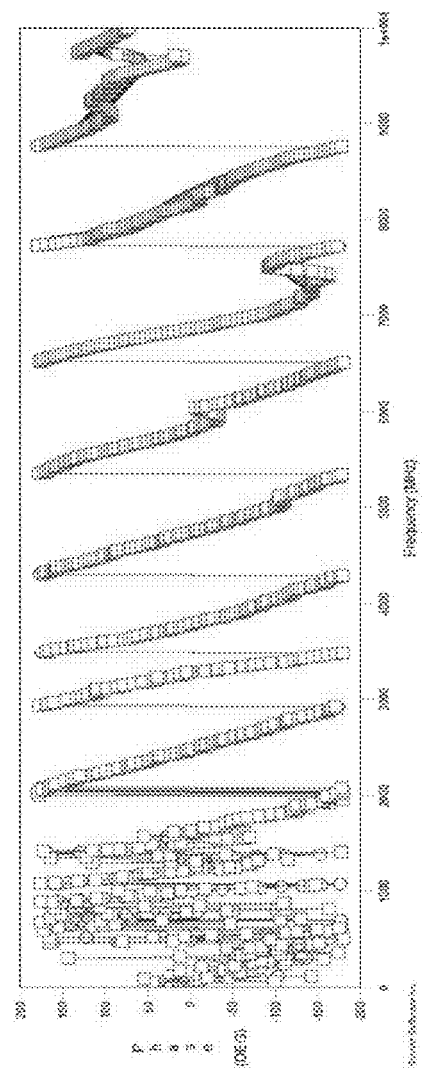
FIG. 14 is a graph of $S_{13}$ (Near-End Coupling) Frequency vs. Phase according to an exemplary embodiment.

Referring to FIGS. 13 and 14, shown in FIG. 13 is a graph of $S_{13}$ (Near-End Coupling) Frequency vs. Magnitude, while shown in FIG. 14 is a graph of $S_{13}$ (Near-End Coupling) Frequency vs. Phase. In FIG. 13, the x-axis is frequency in MHz and the x-axis is magnitude in dB. The squares show the original measurements of $S_{13}$ frequency, while the circles show the $S_{13}$ values per the $S_{rd}$ model 404. There is a strong correlation between the original measurements and the $S_{rd}$ model 404. In FIG. 14, the x-axis is frequency in MHz and the x-axis is phase in degrees. The squares show the original measurements of $S_{13}$ frequency, while the circles show the $S_{13}$ values per the $S_{rd}$ model 404. There is a strong correlation between the original measurements and the $S_{rd}$ model 404.

Figure 15:
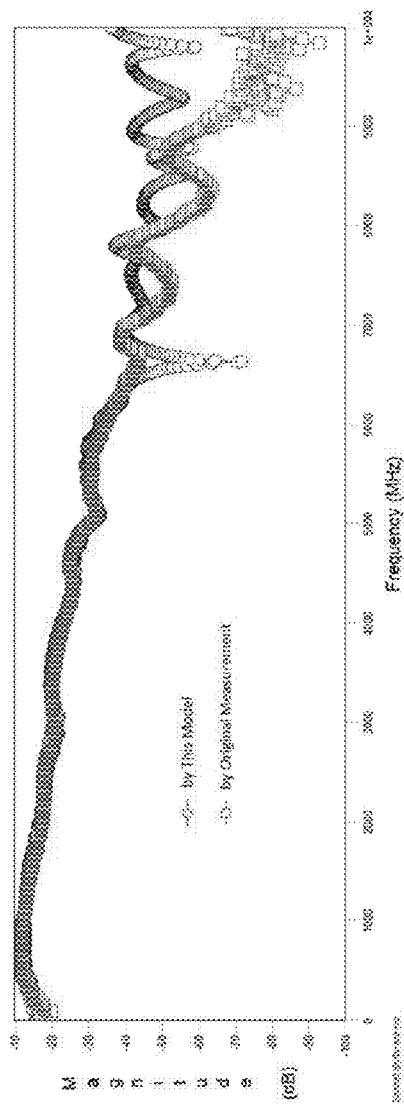
FIG. 15 is a graph of $S_{14}$ (Far-End Coupling) Frequency vs. Magnitude according to an exemplary embodiment.
Figure 16:
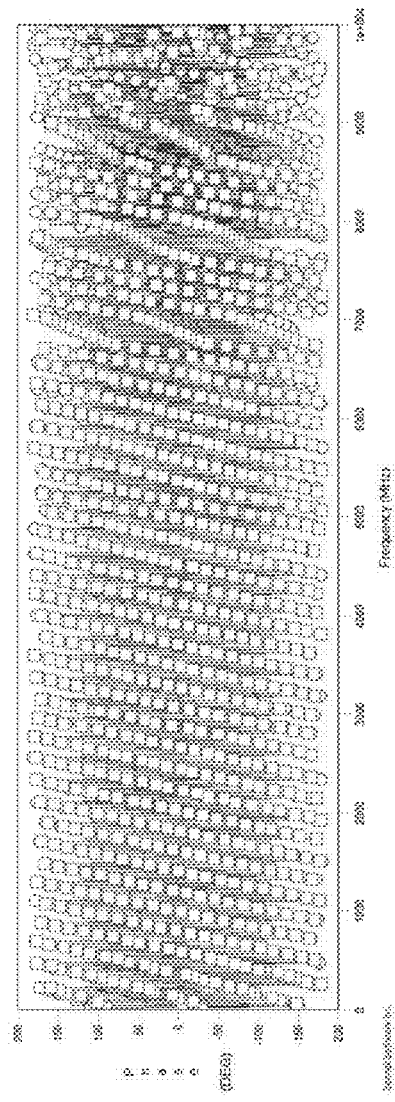
FIG. 16 is a graph of $S_{14}$ (Far-End Coupling) Frequency vs. Phase according to an exemplary embodiment.

Referring to FIGS. 15 and 16, show in FIG. 15 is a graph of $S_{14}$ (Far-End Coupling) Frequency vs. Magnitude, while shown in FIG. 16 is a graph of $S_{14}$ (Far-End Coupling) Frequency vs. Phase. In FIG. 15, the x-axis is frequency in MHz and the x-axis is magnitude in dB. The squares show the original measurements of $S_{14}$ frequency, while the circles show the $S_{14}$ values per the $S_{rd}$ model 404. There is a strong correlation between the original measurements and the $S_{rd}$ model 404. In FIG. 16, the x-axis is frequency in MHz and the x-axis is phase in degrees. The squares show the original measurements of $S_{14}$ frequency, while the circles show the $S_{14}$ values per the $S_{rd}$ model 404. There is a strong correlation between the original measurements and the $S_{rd}$ model 404.

Figure 17:
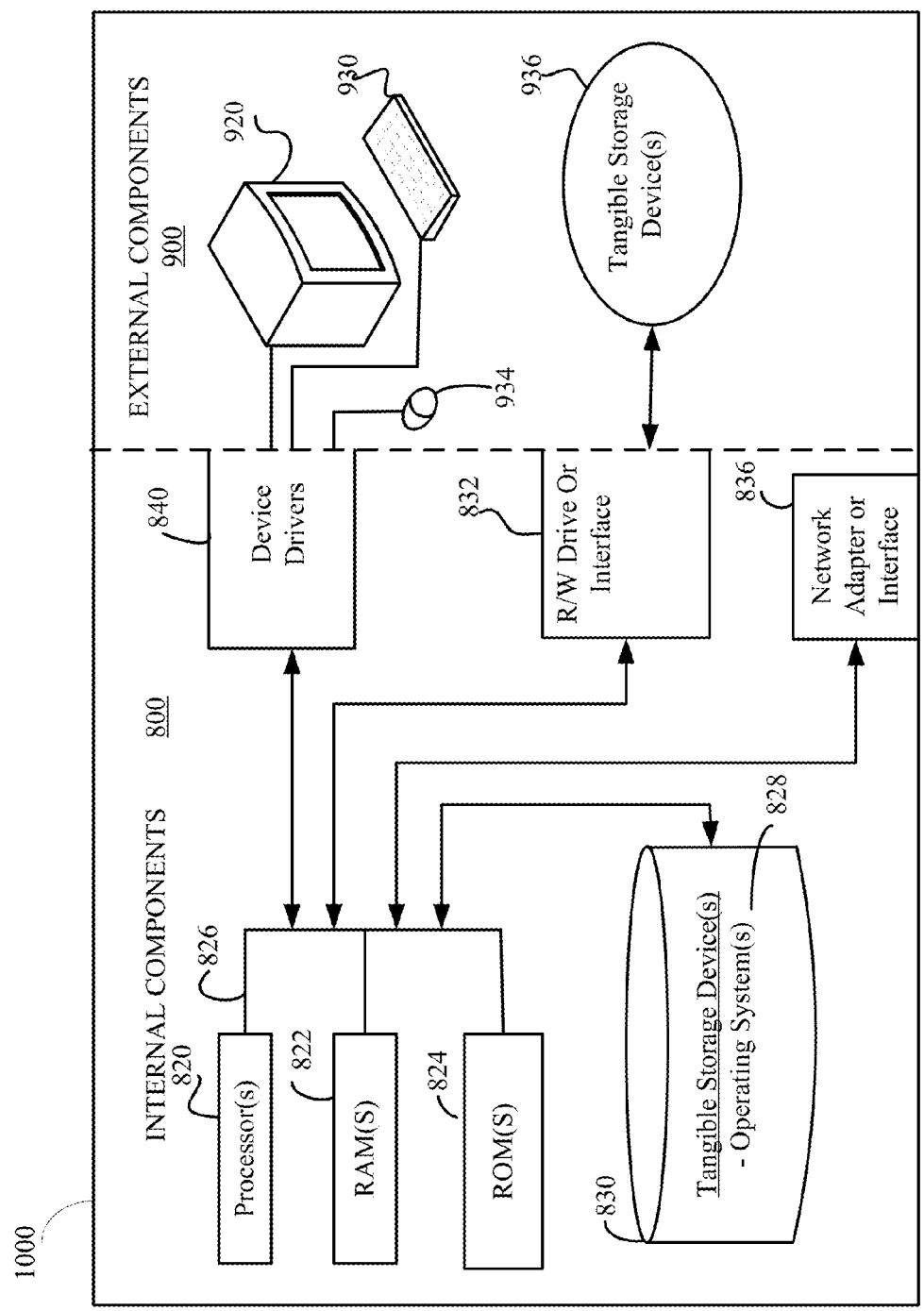
FIG. 17 is a schematic block diagram of hardware and software of the computer environment according to an embodiment of the processes depicted in FIG. 4.

Referring now to FIG. 17, computing device 1000 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the method of FIG. 2; and one or more computer-readable tangible storage devices 830. The one or more operating systems 828 (including the additional data collection facility) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 600, can be downloaded to computing device 600 from an external computer (e.g., server) via a network (for example, the Internet, a local area network, or other wide area network) and respective network adapters or interfaces 836. From the network adapters (or switch port adapters) or interfaces 836 and operating system 828 associated with computing device 600 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The twinaxial cable SPICE circuit model with reduced delay 504, 518, provides a simple and accurate long delay S-parameter modeling method. The large delay of the original S-parameters is reduced for easier treatment in the fast channel simulation without using small frequency steps in the S-parameter model and provides easier S-parameter modeling in transient simulation without large orders of curve-fitting.

The complete delay model 500, provides an accurate modeling method to keep the transmission and return loss as well as the common to differential-mode and differential-to-common mode conversion. This method also provides for less frequent sampling, providing an advantage of reducing the amount of calculations needed for the SPICE model.

The reduced delay twinaxial SPICE circuit model 400 and the complete delay twinaxial circuit model 500 can be used to model signals through the two signal wires of a twinaxial cable. A delay of a twinaxial cable S-parameters is reduced, providing for easier treatment in a fast channel simulation without using a very small frequency step in the S-parameter model. Increasing the frequency step in the S-parameter model may help to reduce the amount of calculations required in the generation of the reduced delay twinaxial SPICE circuit model 400.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method to generate a complete delay twinaxial Simulation Program with Integrated Circuit Emphasis (SPICE) model, the method comprising:

generating a reduced delay twinaxial SPICE model, the reduced delay twinaxial SPICE model comprising:

directly measuring near end S-parameter components and far end S-parameter components of a twinaxial cable, using a vector network analyzer;

reducing an original time delay of the far-end S-parameter components by multiplying each of the far-end S-parameter components by a complex exponential based on an equivalent delay length, a signal frequency, and an effective dielectric constant, wherein the complex exponential is $e^{j\beta L}$, where $\beta=2\pi f\sqrt{(\in_{reff})}L/c_0$, j is the unit imaginary part of a complex number where $j^2=-1$, L is an effective delay length of the twinaxial cable, f is the signal frequency, $\in_{reff}$ is the effective dielectric constant, and $c_0$ is the speed of light in a vacuum;

simulating a signal transmitted across a twinaxial cable by running a 4-port SPICE model using the near end S parameter components and the multiplied far end S parameter components;

recording a magnitude and a phase of the transmitted signal with respect to frequency as outputs of the reduced delay twinaxial SPICE model;

recovering an original time delay of the far-end S-parameter components using at least two ideal transmission line models;

blocking incident waves of the transmitted signal using at least two directional junction circuit models; and comparing a measured magnitude and phase with respect to frequency of the twinaxial cable, to the recorded magnitude and phase with respect to frequency of the reduced delay twinaxial SPICE model.

\* \* \* \* \*